US012769917B1

(12) United States Patent
Zhu et al.

(10) Patent No.: US 12,769,917 B1
(45) Date of Patent: Oct. 20, 2026

(54) SIMULATION BASED ANALYSIS OF ELECTROMAGNETIC FAULT INJECTION

(71) Applicant: ANSYS, INC., Canonsburg, PA (US)

(72) Inventors: Deqi Zhu, San Jose, CA (US); Lang Lin, Cupertino, CA (US); Norman Chang, Fremont, CA (US); Jimin Wen, Pleasanton, CA (US); Yu Lu, San Ramon, CA (US); Hua Chen, Chengdu (CN); Sreeja Chowdhury, San Jose, CA (US); Harsh Shrivastav, Milpitas, CA (US)

(73) Assignee: ANSYS, INC., Canonsburg, PA (US)

( * ) Notice: Subject to any disclaimer, the term of this patent is extended or adjusted under 35 U.S.C. 154(b) by 1143 days.

(21) Appl. No.: 17/646,698

(22) Filed: Dec. 31, 2021

Related U.S. Application Data

(60) Provisional application No. 63/235,516, filed on Aug. 20, 2021.

(51) Int. Cl.
*G06F 30/367* (2020.01)
*G06F 117/02* (2020.01)
*G06F 119/06* (2020.01)
*G06F 119/12* (2020.01)

(52) U.S. Cl.
CPC ........ *G06F 30/367* (2020.01); *G06F 2117/02* (2020.01); *G06F 2119/06* (2020.01); *G06F 2119/12* (2020.01)

(58) Field of Classification Search
None
See application file for complete search history.

(56) References Cited

U.S. PATENT DOCUMENTS

2006/0064262 A1* 3/2006 Chang ..................... G06F 19/00 702/84

OTHER PUBLICATIONS

M. Dumont, M. Lisart and P. Maurine, "Modeling and Simulating Electromagnetic Fault Injection," in IEEE Transactions on Computer-Aided Design of Integrated Circuits and Systems, vol. 40, No. 4, pp. 680-693, Apr. 2021, doi: 10.1109/TCAD.2020.3003287. (Year: 2021).*
C. Gaine, D. Aboulkassimi, S. Pontie, J.-P. Nikolovski and J. -M. Dutertre, "Electromagnetic Fault Injection as a New Forensic Approach for SoCs," 2020 IEEE International Workshop on Information Forensics and Security (WIFS), New York, NY, USA, 2020, pp. 1-6, doi: 10.1109/WIFS49906.2020.9360902. (Year: 2020).*

(Continued)

*Primary Examiner* — Rehana Perveen
*Assistant Examiner* — Kyle H Tseng
(74) *Attorney, Agent, or Firm* — WOMBLE BOND DICKINSON (US) LLP

(57) ABSTRACT

Simulation systems and methods described in this disclosure can create simulations of electromagnetic fault injection (EMFI), from a simulated probe, into a simulated circuit to evaluate and rank EMFI vulnerabilities in the circuit. A method in one embodiment can include the operations of: applying a simulated source of electromagnetic radiation near a surface of a circuit in a simulation of the circuit; computing a simulated set of induced voltages in the circuit as a result of the application of the simulated source near the surface of the circuit; and determining from the set of induced voltages a set of fault vulnerabilities in the circuit.

18 Claims, 10 Drawing Sheets

(56) References Cited

OTHER PUBLICATIONS

Given-Wilson, Thomas, Nisrine Jafri, and Axel Legay. "Combined software and hardware fault injection vulnerability detection." Innovations in Systems and Software Engineering 16, No. 2 (2020): 101-120. (Year: 2020).*

N. Moro, A. Dehbaoui, K. Heydemann, B. Robisson and E. Encrenaz, "Electromagnetic Fault Injection: Towards a Fault Model on a 32-bit Microcontroller," 2013 Workshop on Fault Diagnosis and Tolerance in Cryptography, Los Alamitos, CA, USA, 2013, pp. 77-88 , doi: 10.1109/FDTC.2013.9. (Year: 2013).*

Lin et al. "Fast and comprehensive simulation methodology for layout-based power-noise side-channel leakage analysis." In 2020 IEEE International Symposium on Smart Electronic Systems (iSES)(Formerly iNiS), pp. 133-138. IEEE, 2020. (Year: 2020).*

Poggi, Davide, Thomas Ordas, Alexandre Sarafianos, and Philippe Maurine. "Checking robustness against EM side-channel attacks prior to manufacturing." IEEE Transactions on Computer-Aided Design of Integrated Circuits and Systems 41, No. 5 (2021): 1264-1275. (Year: 2021).*

* cited by examiner

Ts2 = setup time needed of FF2
Th2 = hold time needed of FF2
Tc2q = Time from clock pin to Q pin of FF
Tskew = Time for clock path
Tcomb = Time for the combinational instances on the Data Path

SIMULATION BASED ANALYSIS OF ELECTROMAGNETIC FAULT INJECTION

This application claims the benefit of the filing date of U.S. provisional patent application No. 63/235,516 which was filed on Aug. 20, 2021, and this provisional patent application is hereby incorporated herein by reference.

BACKGROUND

This disclosure relates to the field of circuit design, and more particularly to the design of circuits that may be subject to attacks to cause faults in the circuit. Electromagnetic Fault Injection (EMFI) has recently gained popularity as a mechanism to induce faults to compromise the functionality and data confidentiality of integrated circuits (ICs). In a typical EMFI attack, a low-cost magnetic coil is excited with harmonic or pulse signals to generate an electromagnetic (EM) field near the IC. Through inductive coupling to the metal routing of an integrated circuit, a strong EM field can cause power and signal integrity problems in the IC. EMFI is a strong physical attack which can create faults in an IC without requiring extra processes such as package removal or physical modification; in other words, an EMFI attack can be performed without removing the packaging around an IC. Due to the inductive coupling between the coil and on-chip power/ground meshes, an EMFI attack injects a magnetic field (B field) into all wire loops of the victim device. This magnetic field can cause variations or swings in the voltages on the power grid (e.g., Vdd and Vss power supply rails) in the IC. Such voltage swings reflected by L*di/dt can propagate through the entire RLC network of the device, resulting in a voltage overshoot/undershoot in the power and ground networks of the IC. If such voltage swings affect the gates/registers of the ICs involved in any security critical logics, it can cause faults that have the potential of leaking data or bypassing security mechanisms in the IC.

SUMMARY OF THE DESCRIPTION

In one embodiment, a layout based EMFI analysis can be based on a simulation of a circuit such as an IC. Simulation systems and methods described in this disclosure can create simulations of electromagnetic fault injection (EMFI), from a simulated probe, into a simulated circuit to evaluate and rank EMFI vulnerabilities in the circuit. In one embodiment, the simulation, done on a simulation system, can be based on inputs from circuit designers about simulated signals from a probe and parameters about the probe (e.g., geometry data about a coil in the simulated probe, etc.). The result of one or more simulations can help circuit designers develop countermeasures (e.g., at the layout level of the IC) to mitigate EMFI attacks and protect the most vulnerable or sensitive gates (instances) in the circuit. In one embodiment, a simulation can reveal how an EMFI attack will cause voltage variations (e.g., dynamic voltage swings) on an IC's power grid and how that attack can cause faults based on those variations and also based on changes in timing slack for signals in the circuit.

In one embodiment, a method performed by a simulation system can include the following operations: applying a simulated source of electromagnetic radiation near a surface of a circuit in a simulation of the circuit; computing a simulated set of induced voltages in the circuit as a result of the application of the simulated source near the surface of the circuit; and determining from the set of induced voltages a set of fault vulnerabilities in the circuit. In one embodiment, the electromagnetic radiation can comprise one of: (a) a magnetic field from a conductive coil in a simulated probe or (b) a simulated light from a laser. In one embodiment, the set of fault vulnerabilities can indicate variations in power supply voltages in an IC's power grid (e.g., tile based variation metrics) and can also indicate changes in timing slack values which can result from the variations in the power supply voltages. In one embodiment, the method can further include the operation of: computing a set of one or more mutual inductances between the simulated source and a set of conductors in the circuit, and the circuit can be defined by a layout with known geometries and positions for the set of conductors and other components in the circuit. In one embodiment, the set of mutual inductances can comprise a mutual inductance at each of a set of tiles over the simulated physical layout of the circuit, and the data for each tile can comprise physical layout geometry data that defines sizes and positions of the set of conductors and other components in the circuit.

In one embodiment, the method can further include one or more of the operations: ranking the set of fault vulnerabilities to provide a set of ranked positions or point of interest on the circuit for placement of (1) a simulated probe before the circuit is fabricated or (2) a physical probe after the circuit is fabricated; scanning the simulated source across the set of tiles; and computing a simulated dynamic voltage variation in a simulated power gridtile in the circuit based on the set of induced voltages which impact other tiles of the simulated power grid. In one embodiment, the method can further include the operation: receiving, from a user, one or more setup selections prior to applying the simulated source, the setup selections comprising one or more of: (a) signal generation properties that define one or more signals emitted by the simulated source; and (b) one or more parameters that define a geometry of the simulated source. In one embodiment, the method can further include: ranking changes in timing slack in instances in the circuit based on the computed simulated dynamic voltage variation and based on computed resistances in the circuit. In one embodiment, a method can be performed by a data processing system to build a EMFI model fault library, before a circuit design is created; for example, such a system can generate an electromagnetic fault injection model library that includes, for each logic instance in a library of logic instances, one or more metrics of electromagnetic fault injection vulnerabilities.

In one embodiment, a simulation can produce fault vulnerability data at a per instance (e.g., AND gate or inverter or register or other circuit component) level, and security related instances can be flagged to ensure they are simulated at the per instance level. In one embodiment, an efficient mutual inductance coupling model can be established between a coil in a simulated probe and the simulated power grid in a circuit, with geometry information about the coil and the power grid being processed by an electromagnetic field solver. In one embodiment, an EMFI fault model can be generated to bridge the EMFI dynamic voltage swing data to an actual logic fault, including the swing's impact on timing and timing slack.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be considered a simulation system.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
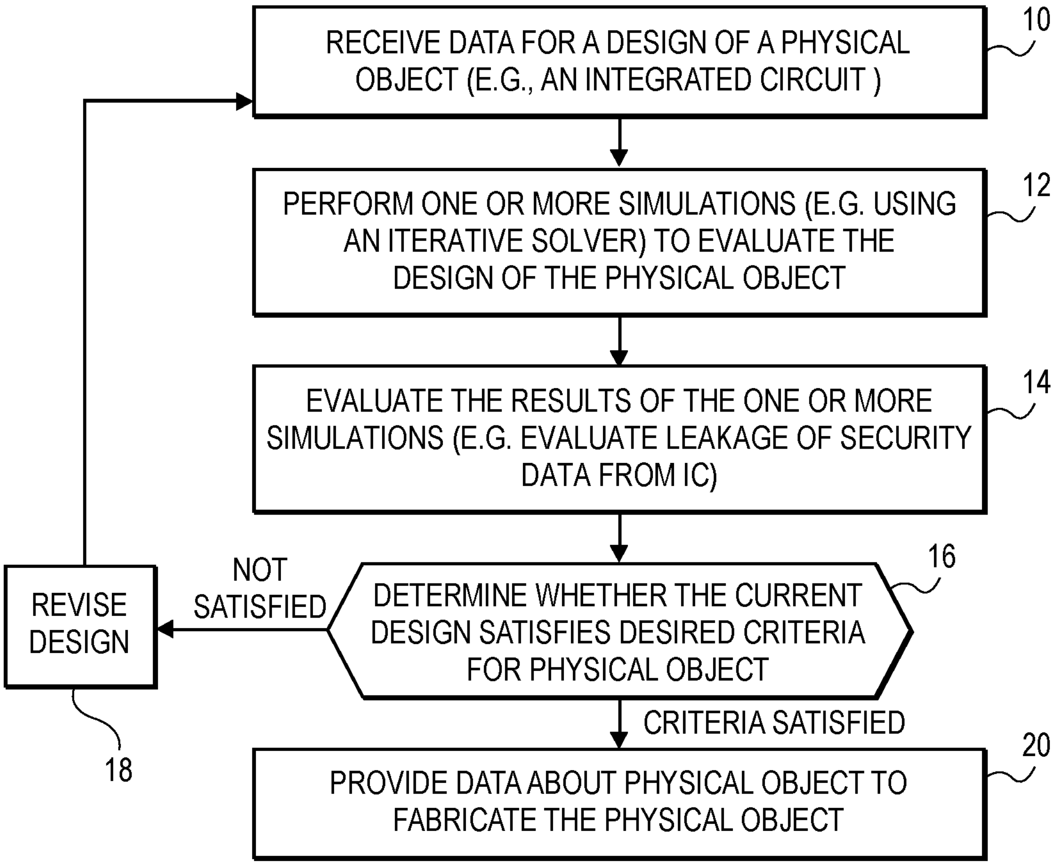
FIG. 1 shows a method that can be used with the one or more embodiments described herein.

The embodiments described herein can be used in simulations (or physical measurements) of electrical circuits (for example, an IC or a plurality of ICs on a circuit board or set of circuit boards) in order to determine whether a particular design of the circuit satisfies particular requirements for the circuit or system containing the circuit. For example, there might be certain design requirements for protecting sensitive data, such as passwords and other cryptographic data and sensitive data, in a device or for preventing logic faults from EMFI attacks. FIG. 1 shows a method in which these design requirements can be tested relative to a particular design of an IC or physical system which is being simulated. In operation 10 of FIG. 1, a data processing system can receive data about a design for a particular IC or other electrical circuit. The data can be created in CAD software on a data processing system, and the data can include information about the gates to be used to fabricate the IC, such as cell library information about the gates, etc. Then in operation 12, the data processing system can perform one or more simulations (such as simulations based on an EMFI attack with a simulated probe) to evaluate the design of the IC. These simulations can use the aspects and embodiments described herein. In one embodiment, the data processing system can perform simulations by using a solver such as an electromagnetic field solver which converges upon a solution that specifies parameters relative to the IC in the simulation. In operation 14, the designer can evaluate the results of one or more simulations to determine whether the design of the IC satisfies certain desired criteria for the design. For example, a designer can determine whether it is too easy to create EMFI faults in the device from current results. This determination is shown in operation 16. If the one or more criteria is satisfied, then the designer in operation 20 can provide data about the circuit to allow the fabrication or manufacture of the IC or system. For example, if the one or more criteria is satisfied, one or more CAD files can be produced that describe how to build the IC or system. If the criteria are not satisfied as determined in operation 16, the designer can revise the design in operation 18 (for example, by applying known countermeasures on identified instances that are most vulnerable to an EMFI attack or by changing sizes and/or quantity of the power distribution network, etc.) and repeat the process by performing additional further simulations to evaluate the redesigned circuit. Thus, the embodiments described herein can be used repeatedly during the redesigning process to evaluate the adequacy of the countermeasures that can be applied during the redesigning process. This can be repeated until the desired criteria are achieved for the circuit.

The embodiments described herein improve upon standard techniques for verifying the level of protection afforded to sensitive data (such as cryptographic keys) by using techniques that improve the speed of simulations and reduce the computational complexity of the simulations, thereby improving the operation of a data processing system (e.g., a computer) performing the simulations and other operations. It will be understood that the sensitive data or cryptographic data can be in various different forms or types, including, for example, passwords, account numbers, account names, hashes, keys of various different types (files keys, device keys), device identifiers, etc. The IC that is simulated or measured in the embodiments described herein can use common cryptographic algorithms such as AES or RSA or ECC to process or protect the cryptographic data.

Figure 2A:
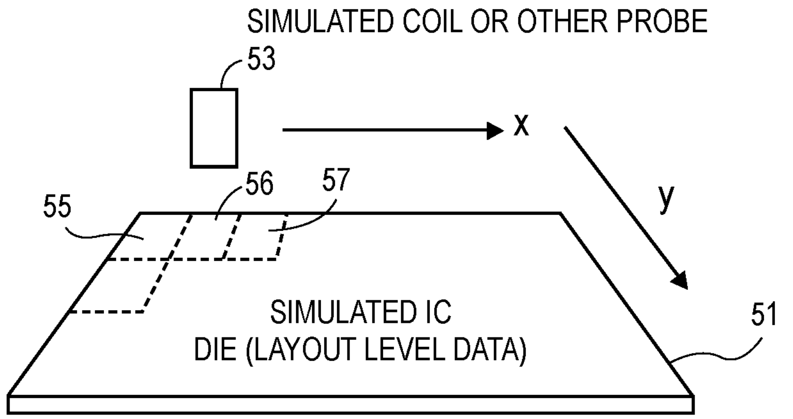
FIG. 2A shows an example of a simulation, performed by a simulation system, according to one embodiment.

FIG. 2A shows an example of a simulation, performed by a simulation system, according to one embodiment. In this example, a simulated IC 51 is subjected to a simulated EMFI attack with a simulated probe 53 which can be an electromagnetic coil or a laser. In one embodiment, the simulated probe 53 is scanned (in X and Y directions) over the surface of the simulated IC 51 so that the probe 53 is placed over each tile in a set of tiles (such as tiles 55, 56, and 57) on the IC 51. The tiles are used to create discrete portions of the IC that can be separately analyzed in the simulations to provide EMFI fault vulnerability data at a per tile level. Those tiles containing known security related circuits (such as a secure enclave or a crypto primitive) can receive additional focus during the simulations. In one embodiment, the tiles can each be 100 microns by 100 microns in size.

Figure 2B:
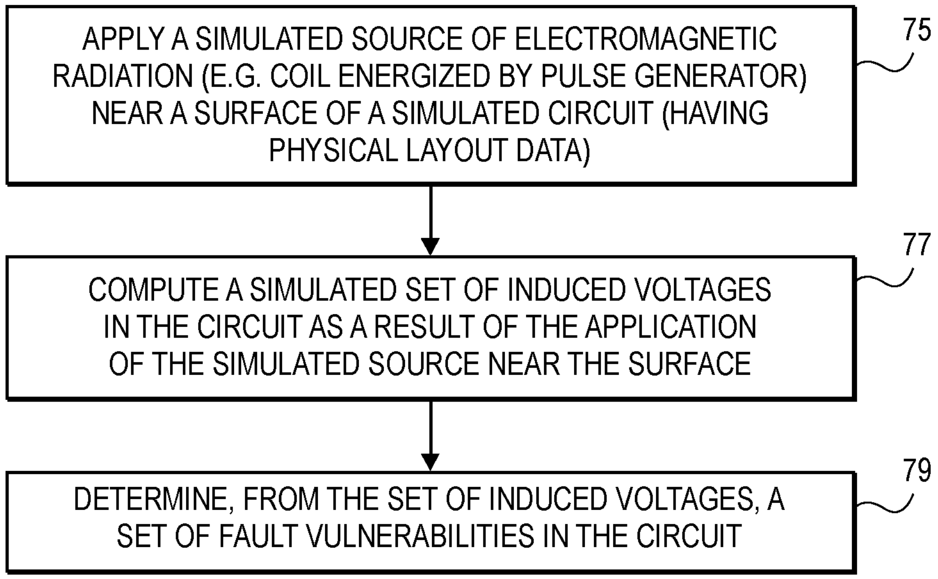
FIG. 2B is a flowchart that illustrates a method according to one embodiment.

FIG. 2B shows a general method according to one embodiment. This method can begin in operation 75 by applying a simulated source of electromagnetic radiation (e.g., simulated probe 53 in FIG. 2A) near a surface of a simulated circuit (e.g., simulated IC 51 in FIG. 2B). In one embodiment, data about the simulated IC can include layout level data that specifies the positions and sizes of structures of circuit components, including wire segments in the IC's power grid (e.g., Vdd and Vss power meshes). In one embodiment, the simulated source can be an EM coil that that is based on designer specified parameters (such as signal parameter values that define the signal applied to the coil and geometry parameters about the coil). In one embodiment, the designer specified values allow a designer to study the impact of the EM coil geometry and signal parameter values (e.g., by varying the geometry and signal parameter values) on a particular layout structure of the IC, and this can allow a designer to consider possible countermeasures at the layout level to mitigate the effects of EMFI attacks and protect the most vulnerable instances (e.g., logic gates). In operation 77, a simulation system can compute a simulated set of induced voltages in the circuit as a result of the application of the simulated source near the circuit. The computed set of induced voltages can then be used to determine, in operation 79, a set of fault vulnerabilities in the circuit. This set of fault vulnerabilities can include a list of tiles containing instances (or, even more specifically, instances within tiles) that are most effected by an EMFI attack based upon dynamic voltage swings or changes in timing slack for signals propagated through each instance. The set of fault vulnerabilities can be one or both of a ranked list of logic faults caused by voltage variations on a power grid of the IC or a ranked list of timing slacks, such as timing slacks that have changed as a result of the EMFI attack. The method shown in FIG. 2B can use the methods and features described further below. For example, the method in FIG. 2B can use the efficient methods described below to compute mutual inductances.

Figure 2C:
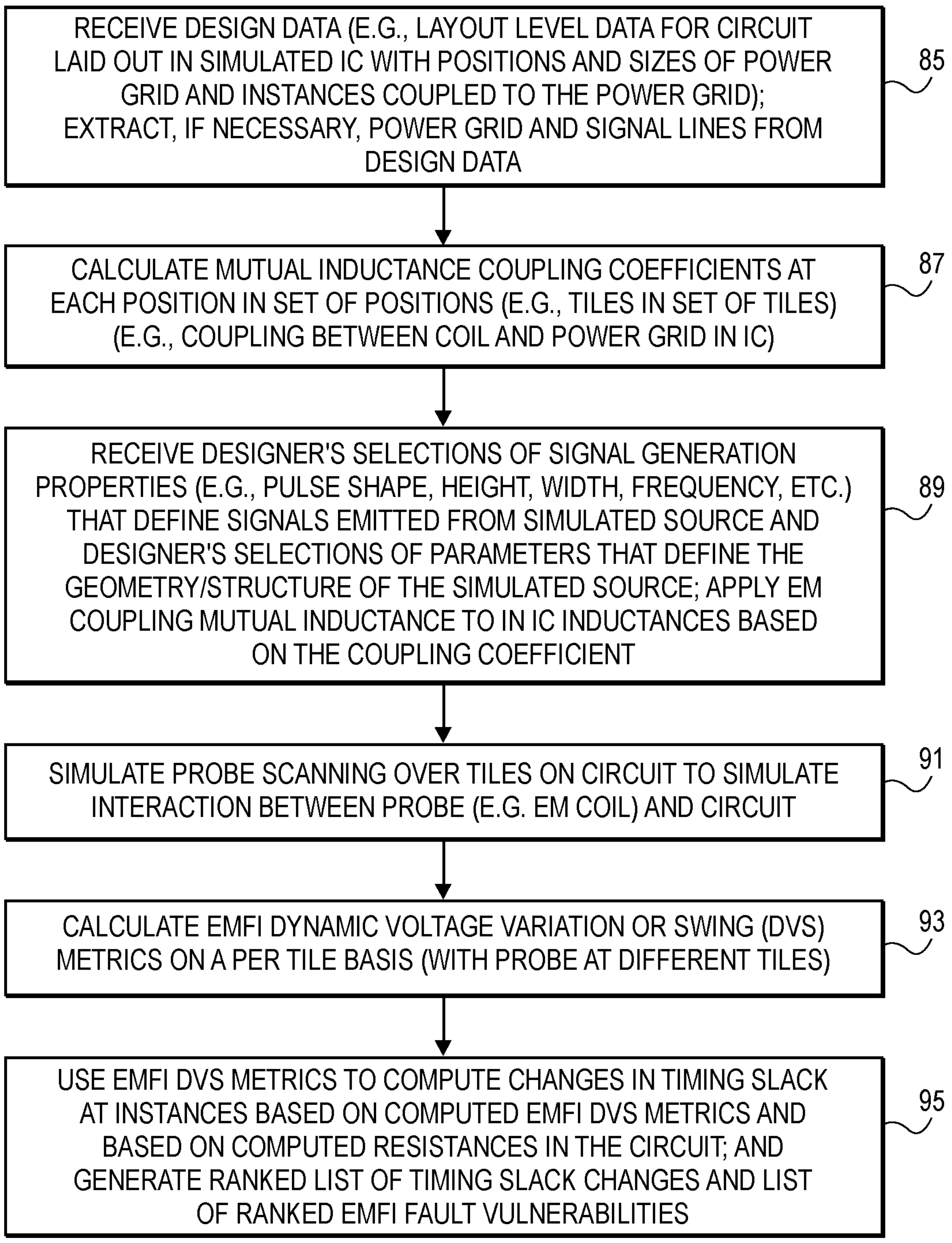
FIG. 2C is a flowchart that shows another method according to another embodiment.

A more specific method according to an embodiment is shown in FIG. 2C. In operation 85 in FIG. 2C, a simulation system can receive design data about a circuit such as an IC. In one embodiment, this design data can be at a layout level, which means that the logic cells (instances) and power grid in the circuit have been laid out in a representation of an IC die so that the positions and sizes of components in the circuit are established in a representation of physical space in the IC die. The design data can include a netlist and the description of the physical layout in the representation of physical space in the IC die. In one embodiment, the design data can be one of the known formats that are used to describe a design of an IC, including for example, the formats: .lib, SDC, a SPICE netlist, GDS/DEF/LEF, tech file, STA, SPEF/DSPF, logic vector, etc., or other applicable formats. In one embodiment, the design data has sufficient information to allow a simulation system to compute inductances of conductors in a power grid of the IC (and also, in one embodiment, signal paths). In operation 87, a simulation system can calculate mutual inductance coupling coefficients at each tile in a set of tiles across the circuit (e.g., the tiles 55, 56, etc. in FIG. 2A). The calculation of these mutual inductance coupling coefficients is described further below (e.g., in conjunction with FIG. 2E). These coefficients specify the EM coupling between the coil in a simulated probe and the conductors in the IC (e.g., power grid in the IC). In operation 89, the simulation system can receive a set of designer selections, including selections that can define the signals emitted from the simulated source (e.g., pulse shape, pulse width, frequency, intensity, etc.) and selections that define the simulated physical geometry of the simulated source (e.g., number of coils, size of coils, proximity to surface of IC, etc.). These selections can allow a designer of the circuit to experiment with the selections relative to one or more designs to improve the design to reduce EMFI vulnerabilities in the circuit. Also in operation 89, the simulation system can apply EM coupling mutual inductance to the IC inductances in the circuit based upon the calculated coupling mutual inductances.

In operation 91, the simulation system can simulate the scanning of the simulated probe over the surface of the circuit; in one embodiment, as the probe is positioned over each tile in a set of tiles on the surface, the simulation system calculates mutual inductances and coupling coefficients for each tile. For example, if the IC has 100 tiles, the simulated probe is positioned once over each of the 100 tiles and the mutual inductances and coupling coefficients at each tile are computed based upon the 100 different positions of the probe, thus providing data indicating how each probe position effects the induced voltages at each tile. This is described further below in conjunction with FIG. 2G. The physical layout data that indicates the sizes and positions of the conductors, instances (e.g., inverters, logic gates, registers, etc.) and other components in the circuit can be used in these computations to compute the mutual inductances and coupling coefficients as described further below. In operation 93, the simulation system can calculate, separately for each tile, the induced voltages which in turn cause variations of the power supply voltages (e.g., Vdd and Vss) at the power supply pins of each instance within a tile; these variations may cause Vdd to fall below desired levels for Vdd and cause Vss to rise above desired levels for Vss which is typically ground (in turn effecting the operation of an instance such as an inverter). These variations can be referred to as dynamic voltage variations or dynamic voltage swings (DVS) that are caused by the simulated EMFI attack. The DVS can vary over time based upon the designer's selected properties for the pulse generator that supplies power to the simulated coil; hence DVS can be represented as a waveform that depicts a varying voltage over time.

Figure 3A:
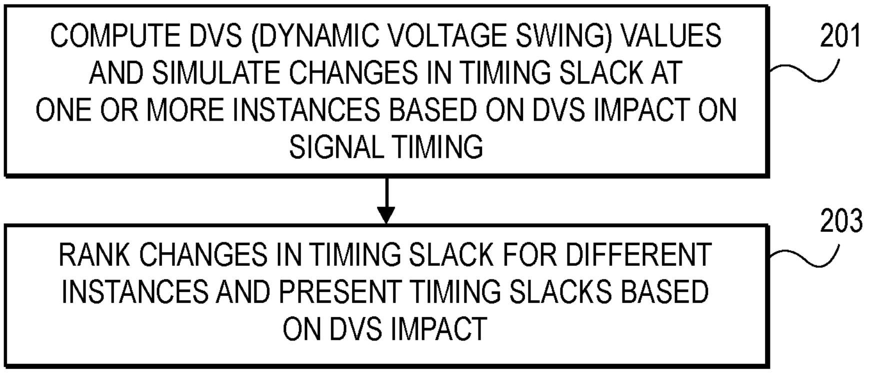
FIG. 3A is a flowchart that shows a method according to one embodiment.

Thus, operation 93 can produce DVS metrics on a per tile basis for use in subsequent operations, such as operation 95 in FIG. 2C or the operations in FIG. 3A. In operation 95, the simulation system can use the computed EMFI DVS metrics to compute changes in timing data, such as timing slack, that are caused by the simulated EMFI attack. The DVS metrics can be used to re-compute timing slack to determine how the timing slack at each instance (in a set of instances) is changed by the simulated EMFI attack. In one embodiment, the simulation system can evaluate this change for the critical timing paths in each tile and can use the known power grid mesh (and its resistances which can be computed from the design data) to propagate the DVS metrics through instances in the critical timing paths. Also in operation 95, the simulation system can generate a ranked list of timing slack changes (e.g., a ranked list that shows timing slack changes for all instances that were processed) and can generate one or more ranked lists of EMFI vulnerabilities. The ranked list of timing slack changes can be one such ranked list of EMFI vulnerabilities, and a ranked list of DVS metrics (in terms of changes to power supply voltages) can be another ranked list of EMFI metrics. These one or more ranked lists can be at a tile by tile basis or be an instance by instance basis.

Figure 2D:
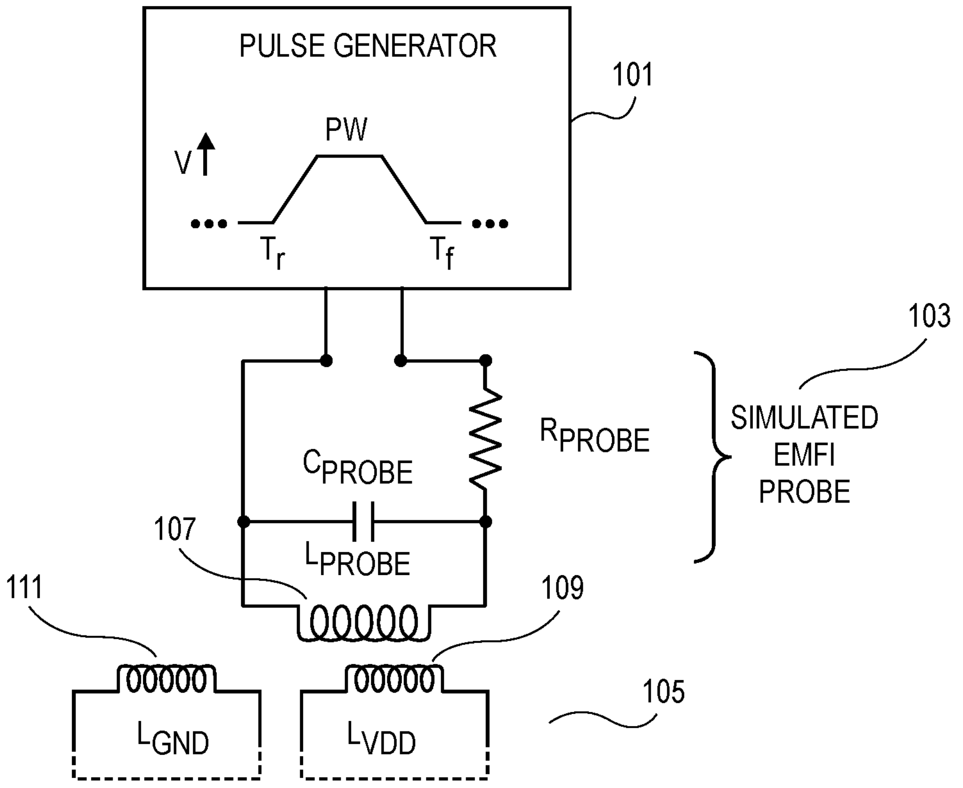
FIG. 2D shows an example of a simulation performed by a simulation system according to one embodiment.
Figure 2F:
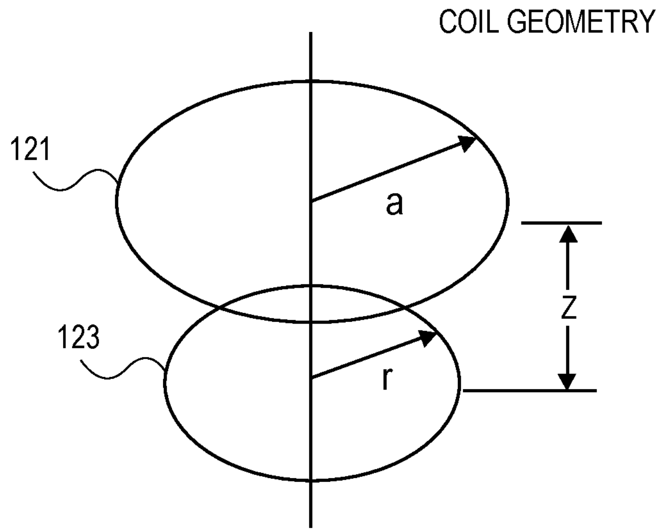
FIG. 2F shows an example of how a coil geometry (in a simulated probe) can be defined in one embodiment.

FIG. 2D shows a schematic representation of a simulation of an EMFI attack. A simulated pulse generator 101 creates pulses that are input to the simulated coil 107 in the simulated EMFI probe 103 (which can be the same as the simulated probe 53 in FIG. 2A). The pulse generator 101 can be simulated to produce pulses based on designer selections (e.g., the selections in operation 89 in FIG. 2C); the generator may generate a harmonic current that is supplied to the simulated coil 107. The ability to make these selections allows a designer to test different selections to see how they affect the simulated EMFI attack on the simulated circuit 105 (which may be an IC). The simulated EMFI probe includes a simulated coil 107 and inherent resistance (Rprobe) and inherent capacitance (Cprobe). The designer can also select (e.g., in operation 89 in FIG. 2C) different coil parameters to see how they affect the EMFI attack; these parameters can include: number of loops in the coil, materials in the coil, spiral geometry of the coil, length of the coil, diameter(s) of the coil, etc. FIG. 2F shows examples of parameters related to coil geometry. The formula to calculate the mutual inductance from the physical geometry of FIG. 2F is shown in equations 1 and 2 below; FIG. 2F shows a simulated coil 121 in a simulated probe and also shows a simulated coil of a conductor 123 that forms a portion of the power grid in the simulated circuit. The coil 121 has a radius of a, and the coil 123 has a radius of r. The designer may also be able to select the distance z between the simulated coil and the surface of the simulated circuit 105. As shown in FIG. 2D, the simulated circuit 105 has inductances formed by, for example, the circuit's power grids. There can be many such inductances, but only two are shown in FIG. 2D: a ground inductance 111 formed by a Vss mesh in the power grid and a Vdd inductance 109 formed by a Vdd mesh in the power grid. These inductances are normally loops, and such loops do exist in ICs. For example, an IC typically includes multiple vertically stacked layers of metal conductors in its Vdd power grid, and theses vertically stacked layers are usually connected electrically through conductive vias. Such an arrangement of conductors in a power grid forms a loop that acts like an inductor even though the power grid is not intended to act as an inductor.

Figure 2E:
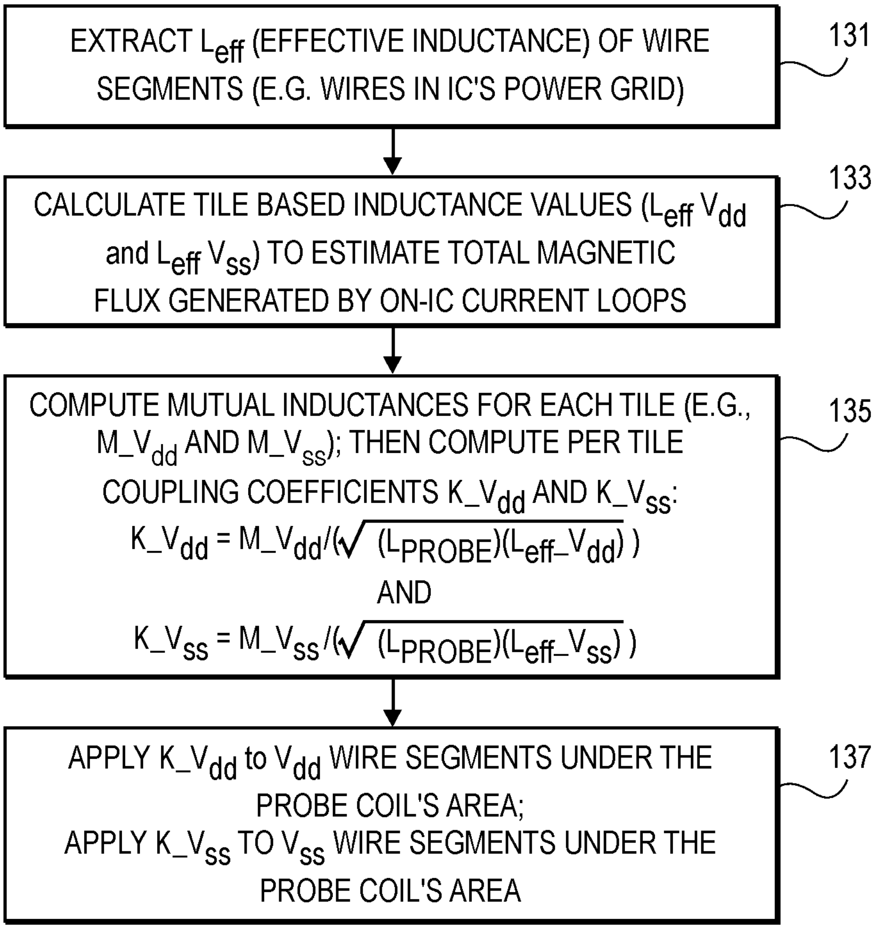
FIG. 2E shows an example of a simulation performed by a simulation system according to one embodiment.

A particular example of a method for computing mutual inductances is shown in FIG. 2E (the formula is found in equations (1) and (2) below). This method may be used as part of the method shown in FIG. 2B or as part of the method shown in FIG. 2C. In operation 131, the simulation system extracts, separately for each tile, effective inductance values (L eff) of wire segments in the circuit's power grid for the tile; numerous techniques are known in the art to perform this extraction, including techniques described in U.S. Pat. No. 6,981,230 which may be used in one embodiment in operation 131. In operation 133, the simulation system can calculate, separately for each tile, inductance values for each power grid component (L eff Vdd and L eff Vss). In operation 135, the simulation system can compute a mutual inductance for each tile (e.g., M Vdd and M_Vss for each tile), and these mutual inductances can then be used to compute, separately for each tile, coupling coefficients K_Vdd and K_Vss. These coupling coefficients represent the fraction of magnetic flux linked with the probe's coil and wire loops in the circuit to the total magnetic flux between the coil and the circuit's wire loops. The coupling coefficient is related to the length of the coil, the number of loops in the coil, the spiral geometry of the coil and the sizes of the conductors in the power grid. Operation 135 shows an example of the computation of the coupling coefficients. In one embodiment, mutual inductance can be computed using the following formula:

[equations 1 and 2]

$$M = \frac{2\mu_0\sqrt{ar}}{\text{Ғ}}\left[\left(1 - \frac{\text{Ғ}^2}{2}\right)K(\text{Ғ}) - E(\text{Ғ})\right] \tag{1}$$

$$\text{Ғ} = \sqrt{\frac{4ar}{z^2 + (a + r)^2}} \tag{2}$$

Where the radius of coil is a, the radius of conductor forming the power grid is r, and the proximity of the coil to the surface of the conductor is z; the function K( Ғ ) represents the complete elliptic integral of the first kind, while the function E( Ғ ) represents the complete elliptic integral of the second kind; the permeability constant $\mu_0 \approx 4\pi * 10E{-}7$ H/m is the magnetic permeability of free space, as the material between the coil and the conductor.

In operation 137, the simulation system applies the computed coupling coefficients to the appropriate power grid wire segments in each tile.

Figure 2G:
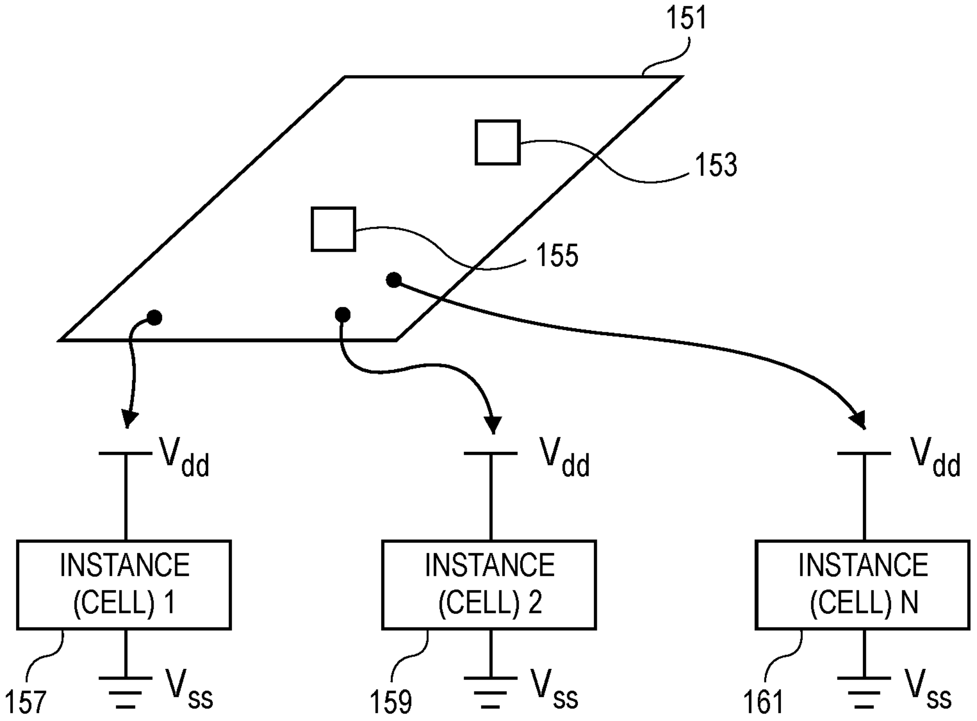
FIG. 2G shows how different positions of a simulated probe (over different tiles on a simulated IC) can produce different effects at different instances (e.g., logic cells in different positions) in the IC.

FIG. 2G shows how the embodiments described herein can compute EMFI related data (from a simulated EMFI attack) on a per tile basis (separately for each tile) based on a simulated attack that occurs over multiple tiles (such as a scan in X and Y of a probe over the entire surface of the circuit). The circuit 151 (e.g., an IC containing the circuit) has been partitioned into discrete tiles (e.g., N by N tiles) which include tiles 153 and 155. A simulated probe (e.g., simulated probe 103) can be positioned separately during a simulation over the tile, including tiles 153 and 155, and then the simulation system can compute induced voltages (as a result of the simulated probe being positioned separately over the tiles, including tiles 153 and 155) at each of instances 157, 159, and 161 which are located in different tiles (not in tiles 153 and 155). For example, the simulation system can perform the method in FIG. 2C for the tile containing instance 157 separately from the tiles containing instances 159 and 161 so that the simulation system can compute a EMFI metric (e.g., DVS metric) at each instance or at least an EMFI metric within each tile (and apply that metric to each instance within that tile). The EMFI metrics can be ranked to guide a designer when changing the design to mitigate against EMFI attacks.

Figure 3B:
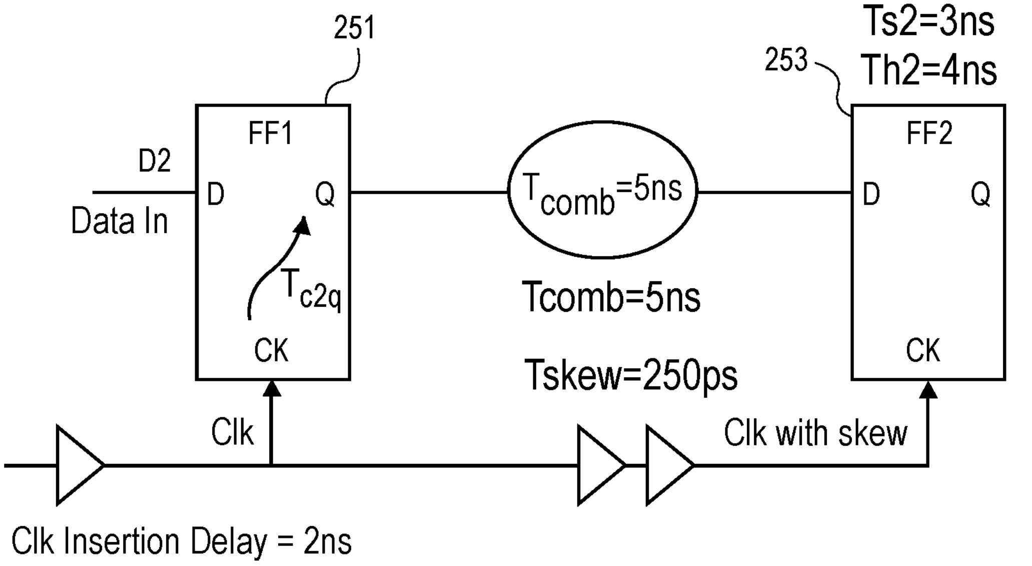
FIG. 3B shows an example of how timing slack can be recalculated based on voltages induced by an EMFI attack.

In one embodiment, a simulation system can re-compute timing slack values based on EMFI fault vulnerabilities that have been determined by a simulated EMFI attack. FIGS. 3A and 3B show an example of how timing slack can be re-evaluated after a simulated EMFI attack, and how an EMFI fault vulnerability can be based on such re-evaluated timing slacks. Timing slack data are well known parameters that are used in, for example, static timing analysis tools to determine whether logic/instances along a critical path in a circuit can operate correctly within a desired clock cycle time. If data cannot be processed correctly by the logic gates within a path because input data is not available at a downstream logic gate during the proper time windows of operation of the downstream logic gate, then the circuit will not properly process the data and there will be a logic fault in the design. A simulated EMFI attack can disrupt the supply voltages in a power grid during operation of a circuit and thereby cause delays in signal propagation through a circuit path; these delays can violate timing requirements in the circuit, such as timing requirements known as setup slack at an input to an instance. In operation 201 in FIG. 3A, a simulation system can compute DVS values on a per tile basis (separately for each tile) and simulate timing slack values that indicate changes in timing slack values at one or more instances based on the DVS impact on timing. The simulation system in operation 201 can perform one or more timing simulations based on the DVS values which indicate disruptions to power supply voltages at a per tile (or per instance) basis. There are many techniques known in the art to perform timing simulations based on voltage waveforms (e.g., dynamic voltage drop simulations), and the DVS values can be represented as such voltage waveforms. These timing simulations can indicate values for timing slacks which circuit designers use to evaluate the performance of a particular circuit design to determine whether it meets timing requirements. Once a simulation system has computed timing simulations to evaluate timing slack, the simulation system in operation 230 can generate a list of timing slacks that incorporate the effect of a simulated EMFI attack. The timing slacks can be ranked (e.g., from largest to smallest); in one embodiment, a simulation system can display a ranked list of changes in timing slacks at a per instance basis. FIG. 3B shows an example of the timing slack between two registers (flip flops) 251 and 253. In this example, a simulation system can determine that a simulated EMFI attack causes a DVS in the combinational instances in the data path between the two registers, and this can change the Tcomb time to a worse slack due to the simulated EMFI attack.

Figure 4:
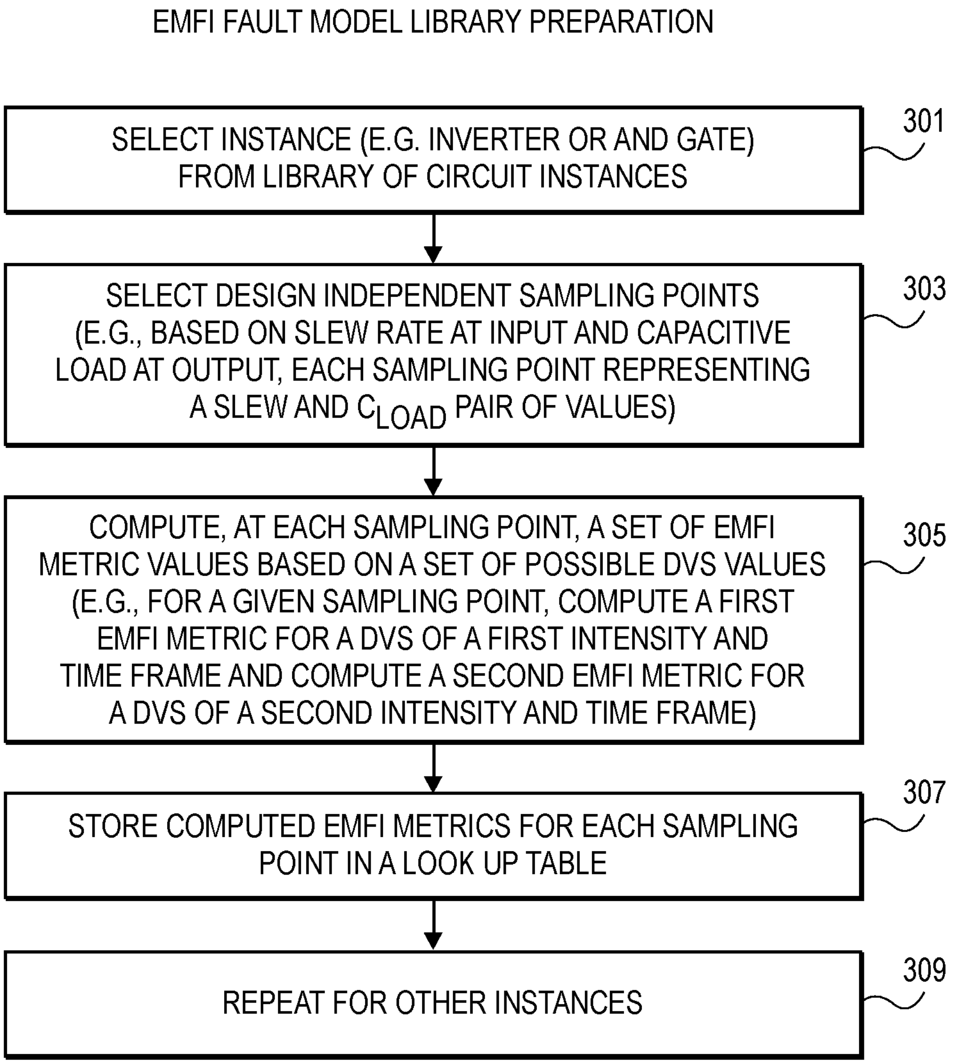
FIG. 4 is a flowchart that shows a method for preparing an EMFI fault model library.

Another aspect of this disclosure includes the creation and use of an EMFI fault model library that can be developed independently of actual layouts of circuits and then used once a circuit is laid out in a design (which uses the library to create the laid out design) to estimate potential EMFI vulnerabilities. Such a library may be used in the methods described above. The EMFI fault model can map an EMFI DVS metric to potential logic fault vulnerabilities for an instance (e.g., an inverter in the library) which can be measured by an EMFI metric that relates to the likelihood that an EMFI attack will cause the instance to fail. FIG. 4 shows an embodiment of a method according to this aspect. In operation 301 of this method, a simulation system can begin by selecting a particular instance from a set of instances in a library; the library can include the typical instances used to create a circuit, including (for example), inverters, registers, AND gates, OR gates, XOR gates, NOR gates, NAND gates, and other circuit components used to create a circuit.

Figure 5A:
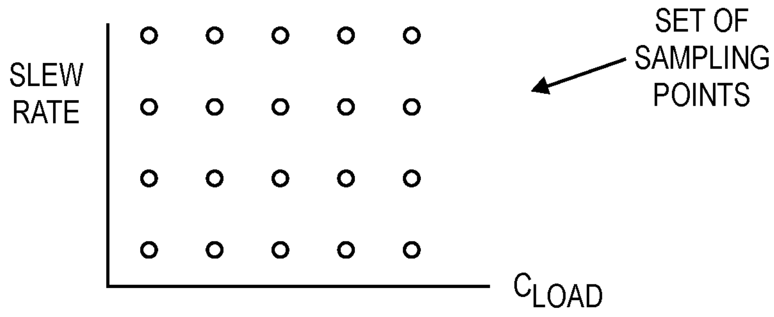
FIG. 5A shows a set of sampling points (over slew rate at an instance's input and the output capacitive load of the instance) which can be used in the method in FIG. 4.

Then in operation 303 in FIG. 4, the simulation system can select design independent sampling points; these sampling points are independent of a laid out design because there is no real sample information from any design yet (e.g., no design with interconnected instances has been laid out in a circuit). In one embodiment, the sampling points are based on an array of points in a two dimensional space; in one embodiment, the space can be defined by two variables that reflect the operating environment of the instance: slew rate at the instance's input and capacitive load (C load). FIG. 5A shows an example of such a space with a set of sampling points, which can be dispersed evenly (or non-evenly) across the space. Alternative embodiments may use different spaces to define the set of sampling points that reflect an operating environment in which an instance operates.

Figure 5B:
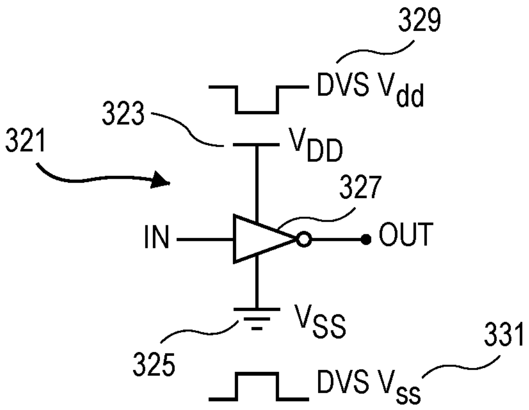
FIG. 5B shows an example of how a dynamic voltage swing can cause a logic fault in an instance, such as an inverter.

Then, in operation 305 in FIG. 4, the simulation system can compute at each sampling point a set of EMFI metric values based on a set of possible DVS values. For example, at a particular sampling point for the instance, the simulation system can compute a first EMFI metric for a first DVS having a first intensity and time frame (period of time) and can compute a second EMFI metric for a second DVS having a second intensity (different than the first intensity) and time frame. In this manner, the simulation system can generate a set of EMFI metrics at different intensities for an instance at a particular sampling point, and these different intensities can be analyzed to determine a point at which the circuit will fail (such that DVS intensities below that point or threshold will not cause a failure but DVS intensities above that point or threshold will cause a logic failure for the instance at the current sampling point. FIG. 5B shows an example of how this analysis can be conducted.

In the example of FIG. 5B, the instance 321 is an inverter 327 that receives power from a Vdd pin 323 and from Vss pin 325. The set of possible DVS intensities can be applied to the power pins to cause the power supply variations at the power supply pins 323 and 325; these power supply variations can cause the inverter 327 to switch its output state (e.g., from high to low) even though the input state has not changed. The point at which these variations cause this to occur can be considered the DVS or EMFI threshold point for the instance at its current sampling point. FIG. 5B shows a DVS intensity 329 for Vdd and a DVS intensity 331 for Vss. DVS intensity for Vdd is the amount of dynamic voltage drop at the Vdd supply pin from the ideal Vdd voltage value (e.g., if the ideal Vdd voltage is 3 volts and the DVS at Vdd causes a drop of 0.6 volts, then the DVS intensity is 0.6 volts or 20% of the ideal Vdd voltage); DVS intensity for Vss is the amount of rise above ideal Vss (e.g., ground) caused by the DVS. At small levels of DVS, the instance will not have a logic fault, but as DVS intensity (or time) increases, a logic fault will occur. The point at which the logic fault occurs can be referred to as the EMFI threshold for the instance at the current sampling point. This EMFI threshold value (expressed as a DVS value or set of DVS values if Vdd and Vss are both used) can be stored, in operation 307, in a lookup table that is indexed by the values of the sampling point (Slew, C load). Operation 305 is repeated for each sampling point until all sampling points are processed for the instance. Operation 305 can use a sweep of possible DVS values across a spectrum of possible DVS values at the current sampling point. The method in FIG. 4 can be repeated (in operation 309) for all instances in the library to generate the EMFI fault model library that can be used once a design is created. Once the design is created, the slew rate and C load of an instance in a tile in the completed design is used to look up its DVS threshold value (in the library's lookup table) to determine if DVS values simulated in the completed design exceed this DVS threshold value from the lookup table. Hence, this lookup table approach can be used in the method of FIG. 2C as an EMFI metric for the instance in the tile for this completed design.

Figure 6:
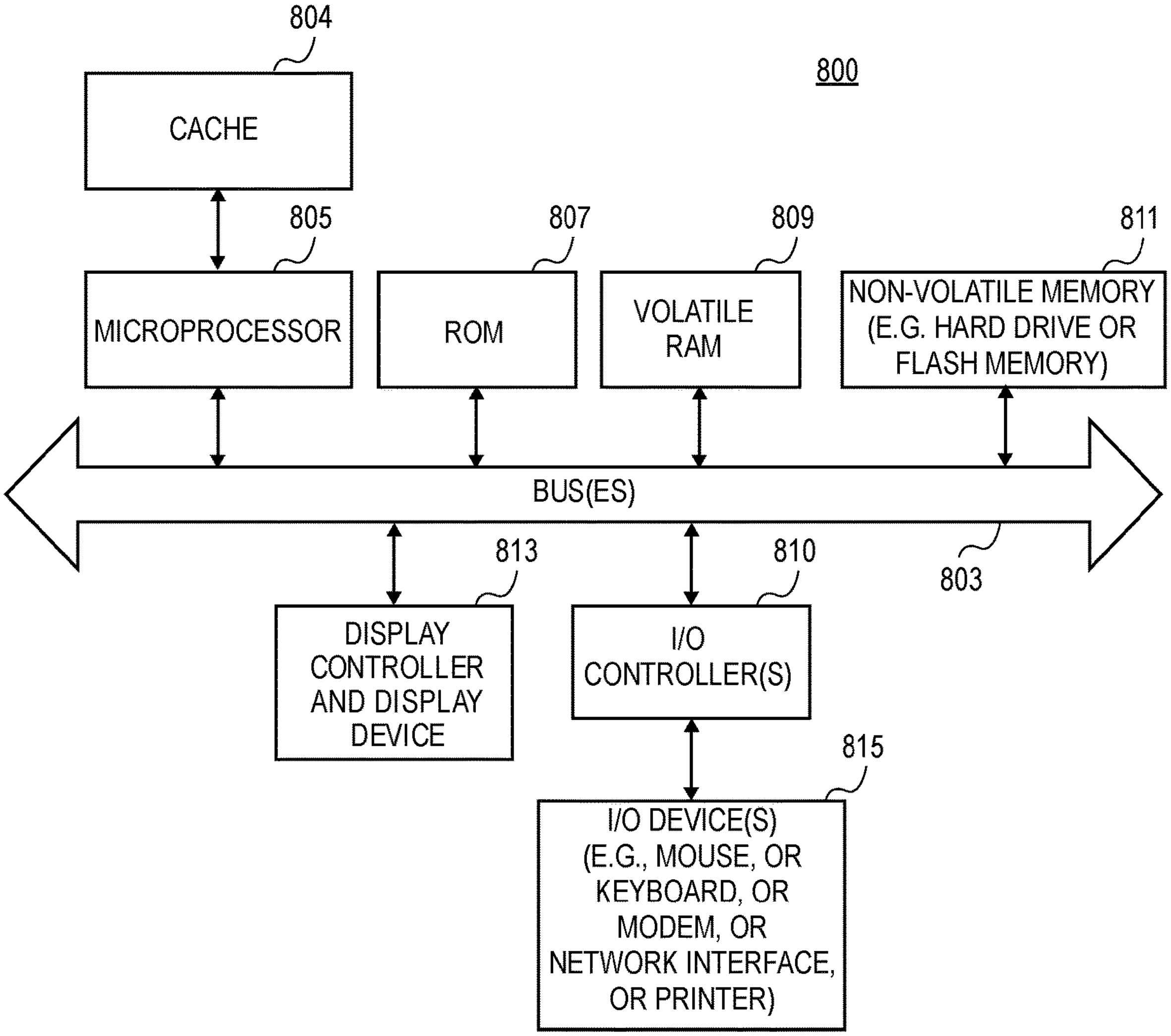
FIG. 6 shows an example of a data processing system that can be used to implement one or more embodiments described herein.

FIG. 6 shows one example of a data processing system 800, which may be used with one embodiment. For example, the system 800 may be implemented to provide a system or device that performs any one of the methods described herein. Thus, the system 800 is an example of a simulation system, and the system 800 can execute the simulation software described herein. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 6 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as “receiving,” “determining,” “sending,” “terminating,” “waiting,” “changing,” or the like, refer to the action and processes of a device, or similar electronic computing device, that manipulates and transforms data represented as physical (electronic) quantities within the device’s registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:

applying a simulated source of electromagnetic radiation near a surface of a circuit in a simulation of the circuit, the simulated source applied over each tile of a set of tiles of the surface;

computing, for each respective tile, a simulated set of induced voltages in the circuit and a mutual inductance for that respective tile resulting from the simulated source positioned over the respective tile near the surface of the circuit; and determining from the simulated set of induced voltages a set of fault vulnerabilities in the circuit; and ranking changes in timing slack in instances at different locations in the circuit based on a simulated dynamic voltage variation in a simulated power grid in the circuit and based on resistances in the circuit.

2. The non-transitory machine readable medium as in claim 1, wherein the electromagnetic radiation comprises one of: (a) a magnetic field from a conductive coil in a simulated probe or (b) simulated light from a laser.

3. The non-transitory machine readable medium as in claim 1, wherein the circuit is defined by a layout with known geometries and positions for a set of conductors and other components in the circuit.

4. The non-transitory machine readable medium as in claim 3, wherein the mutual inductance at each tile of the set of tiles over the simulated physical layout of the circuit collectively form a set of mutual inductances, and data for each tile comprising physical layout geometry data that defines sizes and positions of the set of conductors and other components in the circuit.

5. The non-transitory machine readable medium as in claim 4, wherein the method further comprises:

ranking the set of fault vulnerabilities to provide a set of ranked positions or points of interest on the circuit for placement of (1) a simulated probe before the circuit is fabricated or (2) a physical probe after the circuit is fabricated.

6. The non-transitory machine readable medium as in claim 4, wherein the applying comprises:

scanning the simulated source across the set of tiles.

7. The non-transitory machine readable medium as in claim 6, wherein the method further comprises:

computing the simulated dynamic voltage variation in the simulated power grid in the circuit based on the simulated set of induced voltages which impact the simulated power grid.

8. The non-transitory machine readable medium as in claim 1, wherein the method further comprises:

receiving, from a user, one or more setup selections prior to applying the simulated source, the one or more setup selections comprising one or more of: (a) signal generation properties that define one or more signals emitted by the simulated source; or (b) one or more parameters that define a geometry of the simulated source.

9. The non-transitory machine readable medium as in claim 1, wherein the method further comprises:

generating an electromagnetic fault injection model library that includes, for each logic instance in a library of logic instances, one or more metrics of electromagnetic fault injection vulnerabilities.

10. A machine implemented method, the method comprising:

applying a simulated source of electromagnetic radiation near a surface of a circuit in a simulation of the circuit, the simulated source applied over each tile of a set of tiles of the surface;

computing, for each respective tile, a simulated set of induced voltages and a mutual inductance for that respective tile in the circuit resulting from the simulated source positioned over the respective tile near the surface of the circuit; and determining from the simulated set of induced voltages a set of fault vulnerabilities in the circuit; and ranking changes in timing slack in instances at different locations in the circuit based on the simulated dynamic voltage variation and based on computed resistances in the circuit.

11. The method as in claim 10, wherein the electromagnetic radiation comprises one of: (a) a magnetic field from a conductive coil in a simulated probe or (b) simulated light from a laser.

12. The method as in claim 10, wherein the circuit is defined by a layout with known geometries and positions for a set of conductors and other components in the circuit.

13. The method as in claim 12, wherein the mutual inductance at each of the set of tiles over the simulated physical layout of the circuit collectively form a set of mutual inductances, and data for each tile comprising physical layout geometry data that defines sizes and positions of the set of conductors and other components in the circuit.

14. The method as in claim 13, wherein the method further comprises:

ranking the set of fault vulnerabilities to provide a set of ranked positions or points of interest on the circuit for placement of (1) a simulated probe before the circuit is fabricated or (2) a physical probe after the circuit is fabricated.

15. The method as in claim 13, wherein the applying comprises:

scanning the simulated source across the set of tiles.

16. The method as in claim 15, wherein the method further comprises:

computing the simulated dynamic voltage variation in the simulated power grid in the circuit based on the simulated set of induced voltages which impact the simulated power grid.

17. The method as in claim 10, wherein the method further comprises:

receiving, from a user, one or more setup selections prior to applying the simulated source, the one or more setup selections comprising one or more of: (a) signal generation properties that define one or more signals emitted by the simulated source; or (b) one or more parameters that define a geometry of the simulated source.

18. The method as in claim 10, wherein the method further comprises:

generating an electromagnetic fault injection model library that includes, for each logic instance in a library of logic instances, one or more metrics of electromagnetic fault injection vulnerabilities.

* * * * *